(12) United States Patent
Galehr et al.

(10) Patent No.: US 11,285,987 B2
(45) Date of Patent: Mar. 29, 2022

(54) STEERING COLUMN FOR A MOTOR VEHICLE

(71) Applicants: thyssenkrupp Presta AG, Eschen (LI); thyssenkrupp AG, Essen (DE)

(72) Inventors: Robert Galehr, Schaanwald (LI); Thomas Raich, Vandans (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/970,439

(22) PCT Filed: Feb. 19, 2019

(86) PCT No.: PCT/EP2019/054049
§ 371 (c)(1),
(2) Date: Aug. 17, 2020

(87) PCT Pub. No.: WO2019/162253
PCT Pub. Date: Aug. 29, 2019

(65) Prior Publication Data
US 2020/0377140 A1 Dec. 3, 2020

(30) Foreign Application Priority Data
Feb. 23, 2018 (DE) .................. 10 2018 202 795.1

(51) Int. Cl.
*B62D 1/181* (2006.01)
*B62D 1/185* (2006.01)

(52) U.S. Cl.
CPC ............ *B62D 1/181* (2013.01); *B62D 1/185* (2013.01)

(58) Field of Classification Search
CPC ......... B62D 1/181; B62D 1/185; B62D 1/189
See application file for complete search history.

(56) References Cited

U.S. PATENT DOCUMENTS

| 4,739,673 A | 4/1988 | Ishikawa et al. |
| 5,294,149 A | 3/1994 | Haldric |
| (Continued) | | |

FOREIGN PATENT DOCUMENTS

| CN | 101152874 A | * | 4/2008 | ............. B62D 1/181 |
| CN | 101855122 A | * | 10/2010 | ............. B62D 1/189 |
| (Continued) | | | | |

OTHER PUBLICATIONS

International Search Report issued in PCT/EP2019/054049, dated May 24, 2019.

*Primary Examiner* — Drew J Brown
(74) *Attorney, Agent, or Firm* — thyssenkrupp North America, LLC

(57) ABSTRACT

A steering column for a motor vehicle has an actuating unit that encloses a steering shaft that is rotatable about a rotation axis and which by way of the rear end region thereof that faces the rear of the vehicle is disposed so as to, by means of a first motorized drive, be vertically pivotable by way of an articulated pivot lever on a holding unit which is fastened to the vehicle chassis. The cost-effective attachment of the front end region of the steering column is improved in that the actuating unit in the front end region that faces the front of the vehicle is provided with an elastic bracket element which is fixedly connectable to the vehicle chassis and on account of an elastic deformation permits vertical pivoting as well as axial displacement of the actuating unit.

20 Claims, 3 Drawing Sheets

(56) References Cited

U.S. PATENT DOCUMENTS

| | | |
|---|---|---|
| 6,443,491 B1 | 9/2002 | Fukunaga |
| 2008/0191455 A1 | 8/2008 | Bechtel |
| 2011/0203403 A1 | 8/2011 | Maniwa et al. |
| 2012/0006142 A1 | 1/2012 | Jung |
| 2018/0354546 A1 | 12/2018 | Kreutz |

FOREIGN PATENT DOCUMENTS

| | | | | |
|---|---|---|---|---|
| CN | 102161357 A | | 8/2011 | |
| CN | 203005510 U | * | 6/2013 | ............ B62D 1/181 |
| CN | 107933680 A | | 4/2018 | |
| DE | 3631946 A1 | | 4/1987 | |
| DE | 692 00 931 T | | 4/1995 | |
| DE | 199 11485 A | | 9/1999 | |
| DE | 10 2004 020 048 A | | 11/2005 | |
| DE | 10 2011 083 190 A | | 3/2013 | |
| DE | 10 2012 112 197 A | | 6/2014 | |
| DE | 10 2015 225 488 B | | 12/2016 | |
| DE | 10 2017 206 551 A | | 6/2017 | |
| EP | 1 072 497 A | | 1/2001 | |
| FR | 2749259 A1 | * | 12/1997 | ............ B62D 1/184 |
| JP | H01-173072 U | | 12/1989 | |
| JP | 2008114766 A | * | 5/2008 | ............ B62D 1/189 |
| WO | 2014090349 A | | 6/2014 | |
| WO | 2018/054815 A | | 3/2018 | |

\* cited by examiner

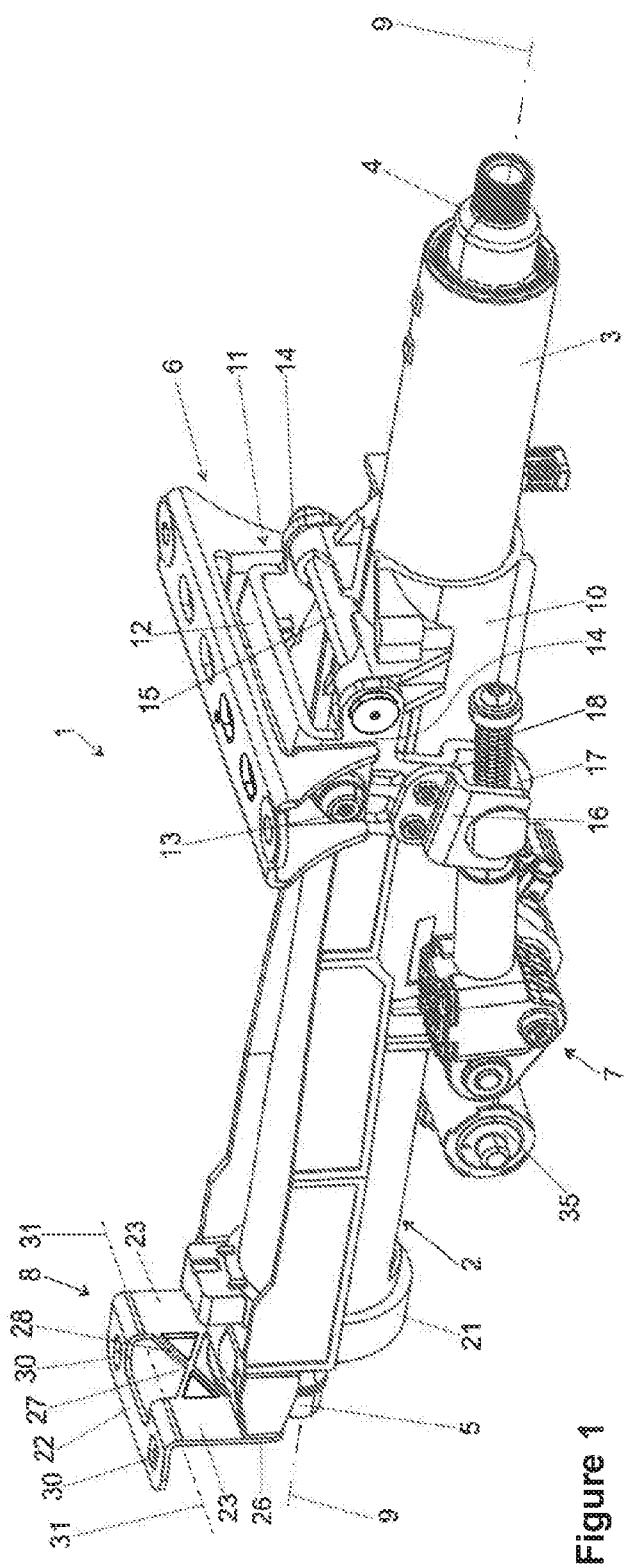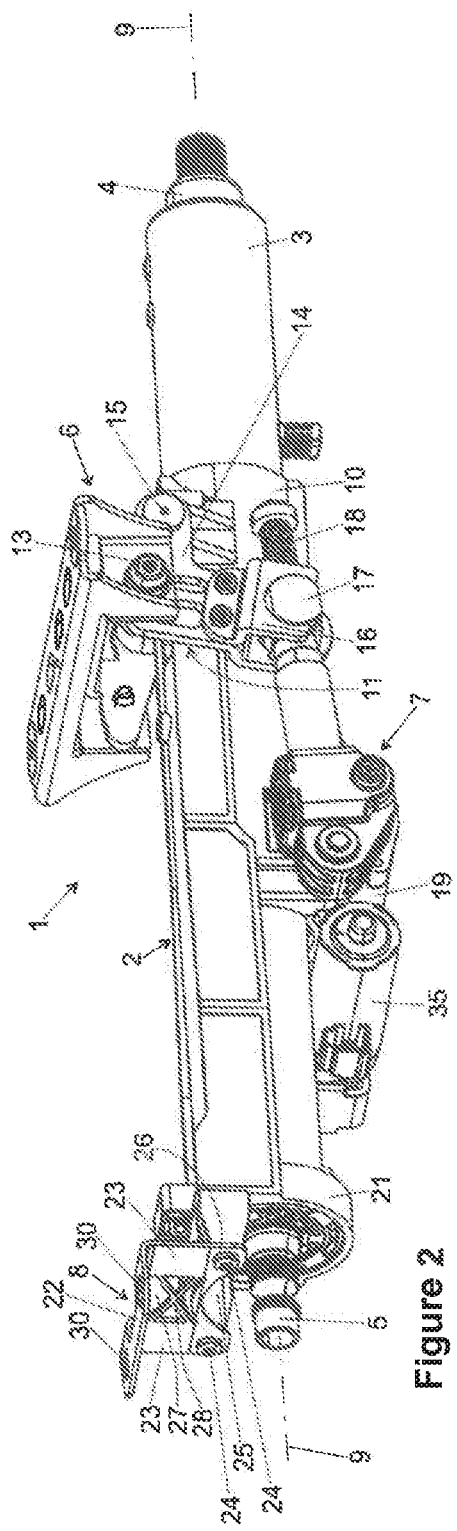

STEERING COLUMN FOR A MOTOR VEHICLE

CROSS REFERENCE TO RELATED APPLICATIONS

This application is a U.S. National Stage Entry of International Patent Application Serial Number PCT/EP2019/054049, filed Feb. 19, 2019, which claims priority to German Patent Application No. DE 10 2018 202 795.1, filed Feb. 23, 2018, the entire contents of both of which are incorporated herein by reference.

FIELD

The present disclosure generally relates to a steering column for a motor vehicle.

BACKGROUND

A steering column which is adjustable in a motorized manner and in which an actuating unit by means of an articulated pivot lever is vertically pivotable is known from DE 10 2004 020 048 A1. Because of the rigid articulation of the actuating unit, complex longitudinal compensation is required because the actuating unit is not only vertically pivoted by the pivot lever but is simultaneously slightly displaced in the axial direction. The known solution for the longitudinal compensation has the disadvantage that such solution is complex and is furthermore associated with disadvantages in terms of the resonant frequency and the stiffness of the steering column.

Thus a need exists for a steering column which is adjustable in a motorized manner and which provides simplified longitudinal compensation.

BRIEF DESCRIPTION OF THE FIGURES

FIG. 1 is a perspective view of a steering column from behind.

FIG. 2 is a perspective view of the steering column from the front.

DETAILED DESCRIPTION

Figure 3:
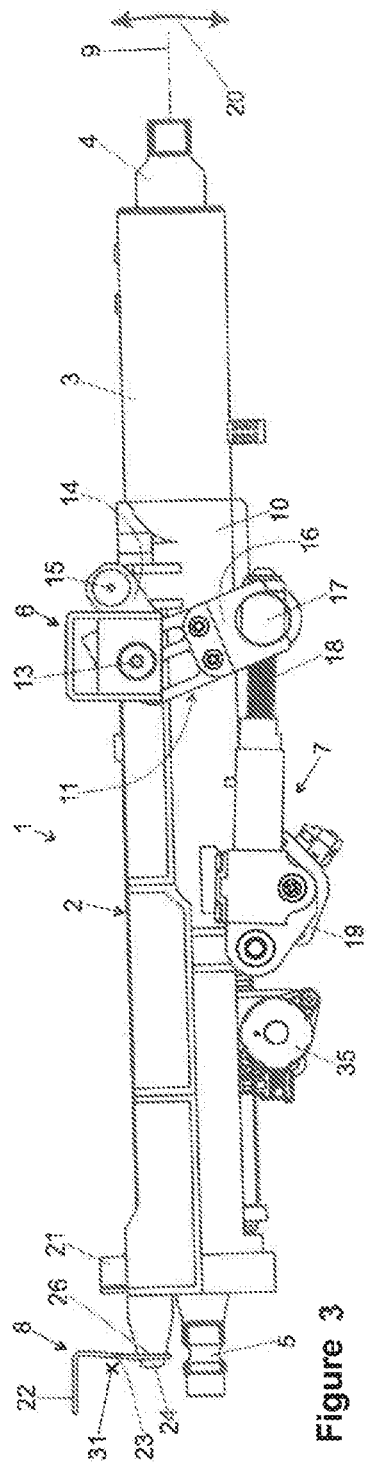
FIG. 3 is an overhead view of a steering column which is completely deployed in an upward manner.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising an actuating unit which receives the steering shaft that is rotatable about a rotation axis, wherein the actuating unit by way of a first steering-wheel proximal end region is disposed in a holding unit so as to be pivotable by means of the first motorized drive.

According to the invention, the actuating unit in the second end region thereof that is opposite the first end region is provided with an elastic bracket element which is provided for fastening to the vehicle chassis and on account of an elastic deformation permits pivoting of the actuating unit about a pivot axis as well as displacing the actuating unit in the direction of the rotation axis (9). The bracket element thus enables a pivoting movement of the actuating unit about the pivot axis and at the same time offers the possibility of longitudinal compensation. The pivot axis in the context of the invention is not to be understood to be a physical pivot axis but the axis about which the actuating unit is pivoted. The pivot axis thus represents an axis in the mathematical sense and is thus formed by a straight line about which the actuating unit is rotatable. The bracket element according to the invention furthermore also fulfils the function of attaching the actuating unit to the vehicle chassis.

The pivot axis is preferably not configured as a rigid axis but as a repositionable instantaneous axis. The pivot axis as a function of the adjusted position thus assumes another position. The instantaneous axis is the axis about which the actuating unit can momentarily be considered and treated as only rotating (at a point in time, evanescent). The velocity in the instantaneous axis in the observed moment is nil, or would be nil if the actuating unit would extend up to the instantaneous axis.

The actuating unit is preferably coupled to the holding unit by way of a pivot lever, wherein the pivot lever is articulated so as to be pivotable on the actuating unit and on the holding unit. The pivot lever is thus attached so as to be pivotable on the actuating unit, and the pivot lever is furthermore attached so as to be pivotable on the holding unit. The pivot lever is furthermore coupled to the first motorized drive. The actuating lever is pivoted by operating the motorized drive such that the pivoting of the actuating lever leads to the actuating unit being pivoted relative to the holding unit.

Alternatively, the motorized drive can also be disposed directly between the actuating unit on the holding unit such that no pivot lever is required, wherein the motorized drive is articulated so as to in each case be pivotable on the actuating unit and the holding unit so that an operation of the motorized drive leads to the actuating unit being pivoted relative to the holding unit.

According to one preferred embodiment, the bracket element comprises sheet metal, said bracket element preferably being formed from sheet metal. It can be provided that the bracket element is formed from spring steel. Such a material offers the strength required for the reliable application of the actuating unit on the vehicle chassis and at the same time offers the elasticity required for the purpose of the invention. Said material is furthermore particularly suitable for a further advantageous design embodiment of the invention according to which the bracket element is designed as a stamped and bent component.

In one further advantageous design embodiment of the invention the bracket element has a thickness (material thickness) with a value between 0.5 mm and 3 mm.

In one advantageous embodiment the bracket element can be conceived in such a manner that the bracket element is elastically deformed when the actuating unit is pivoted about the pivot axis by at most 5° and the actuating unit is simultaneously displaced in the direction of the rotation axis by at most 5 mm.

In one further advantageous design embodiment the bracket element is fastened to the actuating unit by means of one or a plurality of fastening elements. This enables a cost-effective production of the bracket element, for example as a separate stamped and bent component which is subsequently fastened to the actuating unit in a simple manner. Screws or rivets are above all considered as fastening elements.

However, the invention also comprises other types of fastenings such as adhesive bonding, clamping connections, a form-fit, or connections by clasping or deforming fastening elements which are configured either on the bracket element per se or on the actuating unit. In one alternative advantageous embodiment the bracket element is non-releasably connected to the actuating unit. This type of connection is particularly robust.

A further advantageous design embodiment of the non-releasable connection it is provided that the bracket element is fastened to the actuating unit by means of a joining method. Said joining can be performed in particular by welding or soldering/brazing.

One further alternative advantageous embodiment provides that the bracket element and the actuating unit are designed as a single-part integral component. In this embodiment, fastening elements as well as the operative step of fastening the bracket element to the actuating unit during the production of the steering column can be saved.

In one advantageous refinement the bracket element has a bending portion, wherein the lower end region of said bending portion is connected to the actuating unit, and said bending portion, on the upper side thereof, transitions to an angled fastening portion for fastening to the vehicle chassis.

According to a further advantageous embodiment the bracket element has a bending portion, which extends so as to be substantially parallel to a plane which is disposed so as to be orthogonal to the rotation axis of the steering shaft, wherein the end region of said bending portion is connected to the actuating unit and said bending portion, on the upper side thereof, transitions to an angled fastening portion for fastening to the vehicle chassis. When adjusting the steering column for height, the bending portion connected to the actuating unit, as a result of the geometric orientation of said bending portion, can pivot about a horizontal axis as well as resiliently yield in the axial direction so as to guarantee the desired longitudinal compensation. The fastening portion is angled by an angle which is adapted to the shape of the construction of the vehicle chassis such that said fastening portion is oriented so as to be parallel to the fastening region of the vehicle chassis that is provided to this end.

The bending portion advantageously has a central recess on account of which the "spring constant" of the bending portion is reduced so as to enable the deformation of the bending portion required in particular for the longitudinal compensation with less effort in terms of force.

In one advantageous refinement the bracket element can have at least one strut section. The stiffness of the bracket element can be adapted so as to correspond to the targeted requirements on account of such a strut section. In a further advantageous design embodiment the central recess is provided with struts disposed in a cruciform manner. Said struts impede undesirable bending of the bending portion in directions other than those envisaged.

Alternatively or additionally, the bracket element can have corrugations which may likewise serve for adapting the stiffness. One further advantageous design embodiment of the invention provides that a casing tube which by means of a second motorized drive is axially displaceable in relation to the actuating unit and which mounts the steering shaft so as to be rotatable is received in the actuating unit. This measure, apart from the height adjustment of the steering wheel, also enables the longitudinal adjustment in the axial direction of the steering shaft.

A steering column 1 for a motor vehicle can be seen in FIGS. 1 to 5, said steering column 1 having an actuating unit 2, a casing tube 3, a steering shaft comprising an upper steering shaft part 4 which is connectable to a steering wheel (not shown) and a lower steering shaft part 5, holding unit 6 which is to be fastened on the vehicle chassis (not shown), a first motorized drive unit 7, and a bracket element 8. The steering shaft 4, 5 is rotatable about a rotation axis 9.

The actuating unit 2 by way of the first end region 10 thereof that in the installed state faces the steering wheel (not shown) or the rear of the vehicle is articulated on the holding unit 6 which in turn is fixedly connected to the vehicle chassis (not shown). The connection between the first end region 10 of the actuating unit 2, on the one hand, and the holding unit 6, on the other hand, is performed by way of the complex lever device 11 comprising a bridging portion 12 which from the upper side encompasses in a U-shaped manner the actuating unit 2 and which by way of a bolt 13 is articulated on the holding unit 6 and on the right side as well as on the left side of the actuating unit 2 transitions to two pivot levers 14 which are oriented (toward the rear) in the direction of the steering wheel (not shown), said pivot levers 14 in turn being articulated on the actuating unit 2 by means of a bolt 15. The lever device 11 on the side of the actuating unit 2 which in the direction of travel is on the left possesses a drive lever 16 which extends downward and is angled in relation to the pivot lever 14 and which is articulated on the spindle nut 17 which is provided with an internal thread. The spindle nut 17 sits on a spindle 18 which is provided with a thread and on which the spindle nut 17 is displaceable toward the front or the rear relative to the spindle nut 17 when the spindle 18 rotates. The spindle 18 by way of a gear mechanism (not shown) is driven by a first electric motor 19.

In order for the steering shaft 4 and thus the steering wheel (not shown) to be adjusted upward or downward in the pivoting direction 20, the first electric motor 19 is switched on in a first rotating direction, on account of which the spindle 18 likewise rotates in a first rotating direction. The spindle nut 17 on the spindle 18 herein is displaced from the central position shown in FIG. 4 toward the rear, counter to the direction of travel of the vehicle, until the position shown in FIG. 3 has been reached. The spindle 18 herein entrains the drive lever 16, wherein said drive lever 16 in the view of FIGS. 3 to 5 rotates in the counter-clockwise manner about the axis of the bolt 13 and herein entrains the pivot lever 14 such that the pivot lever 14 also rotates in the counter-clockwise manner. The pivot lever 14 by way of the bolt 15 herein entrains the first end region 10 of the actuating unit 2 and pushes said first end region 10 upward such that the entire actuating unit 2 conjointly with the casing tube 3 and the steering shaft 4 is pivoted upward in the pivoting direction 20.

Figure 5:
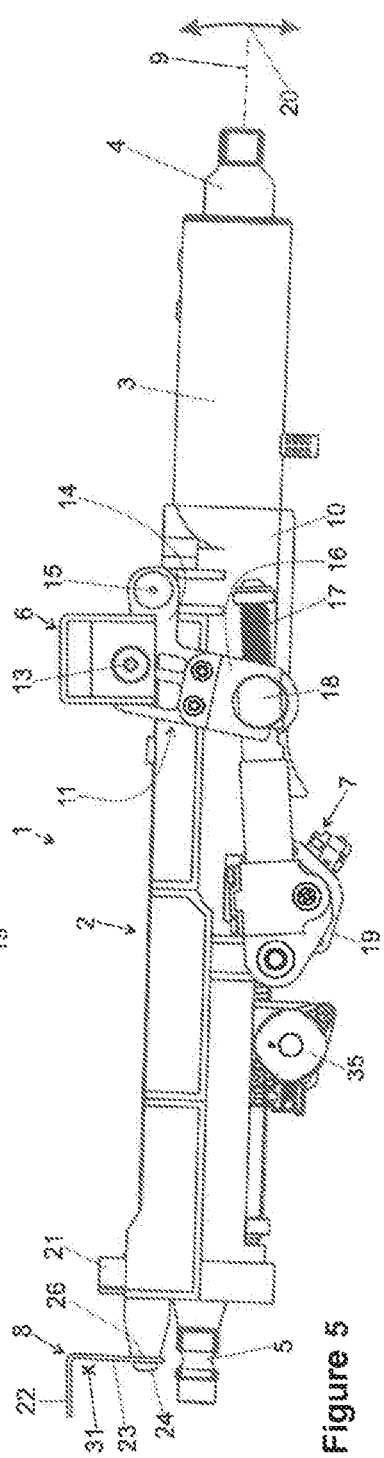
FIG. 5 is an overhead view of the steering column of FIG. 3 in FIG. 4 in a state completely deployed in a downward manner.

When the first electric motor 19 is operated in a second rotating direction counter to the first rotating direction, the spindle 18 thus likewise rotates in the opposite direction, wherein the spindle nut 17 moves to the position which is shown in FIG. 5 and in the direction of travel lies at the front. The drive lever 16 and thus the entire lever device 11 herein is rotated in the clockwise manner about the axis of the bolt 13, this leading to the end of the pivot lever 14 being lowered and thus to the entire actuating unit 2 conjointly with the casing tube 3 and the steering shaft 4 being lowered until the position shown in FIG. 5, in which the steering column 1 has been moved completely downward, has been reached.

A second end region 21 of the actuating unit 2 in the installed state of the steering column 1 is fastened to the vehicle chassis (not shown) by means of a bracket element 8 according to the invention. The bracket element 8 is formed from sheet steel and has a fastening portion 22 and a bending portion 23. The bending portion 23 extends so as to be parallel to a plane, wherein the plane in the non-stressed state of the bracket element 8 is oriented so as to be orthogonal to the rotation axis 9. The non-stressed state is any state in which the bracket element 8 is free of deformation, thus is not elastically deformed. The bracket portion 23 laterally extends beyond the width of the actuating unit 2 and in the lower end region 26 thereof is provided with passages for fastening screws 24 by means of which the bracket element 8 is screw-fitted to the actuating unit 2. The bending portion is preferably of the same width as the actuating unit 8 or wider than the latter. The lower end region 26 in a portion located between the two passages for fastening screws 24 is moreover provided with a recess 25 in the shape of the segment of the circle, so as to achieve free space for the movement of steering shaft parts (not shown), such as a universal joint for example, that are connected to the steering shaft 5. The bending portion 23 is furthermore provided with the central recess 27 which serves for reducing the flexural stiffness of the bending portion 23. The recess 27 extends beyond a bending edge, wherein the bending edge is configured between the bending portion 23 and the fastening portion 22. A cruciform strut section 28 which is intended to impede any bending of the bending portion 23 in directions other than those desired is disposed within the central recess 27.

The cruciform strut section 28 comprises individual struts which are configured as tie rods, wherein the individual struts meet in a central point and converge in the latter. The stiffness of the steering column in the direction of the pivot axis 31 is being increased on account of the cruciform strut section 28.

The bending portion 23 on the upper side thereof transitions to an angled fastening portion 22 which is provided with lateral apertures 30 for passing through fastening elements by way of which the fastening portion 22 can be screw-fitted to the vehicle chassis (not shown). The angle between the fastening portion 22 and the bending portion 23 depends on the construction parameters of the vehicle chassis, wherein the face of the fastening portion 22 is to be oriented so as to be substantially parallel to the opposite fastening face of the vehicle chassis. The angle between the fastening portion 22 and the bending portion 23 preferably has a value between 75° and 110°.

When the rear steering shaft part 4 and the first end region 10 of the actuating unit 2 in an activation of the height adjustment are pivoted in the pivoting direction 20, said pivoting movement thus takes place about a pivot axis 31, the approximate position thereof being plotted in FIG. 1. The position of the pivot axis 31 is repositioned during the pivoting movement, the actuating unit 2 conjointly with the casing tube 3 and the steering shaft parts 4, 5 also being displaced axially toward the front or toward the rear, respectively, in the direction of the rotation axis 9. The pivot axis can thus have a different position in each position of height adjustment. This lies in that the length of the pivot lever 14, said length corresponding to the spacing of the rotation axis of the bolt 13 in the rotation axis of the bolt 15, assumes different positions depending on the angle of rotation of the pivot lever 14 in relation to the rotation axis 9. In other words, the instantaneous center of rotation, thus the pivoting point, of the pivot lever 14 is in the rotation axis of the bolt 13 and thus does not coincide with the pivot axis 31 such that a longitudinal compensation is to be provided which, thanks to the bracket element 8 according to the invention, is provided in a simple and cost-effective manner.

Figure 4:
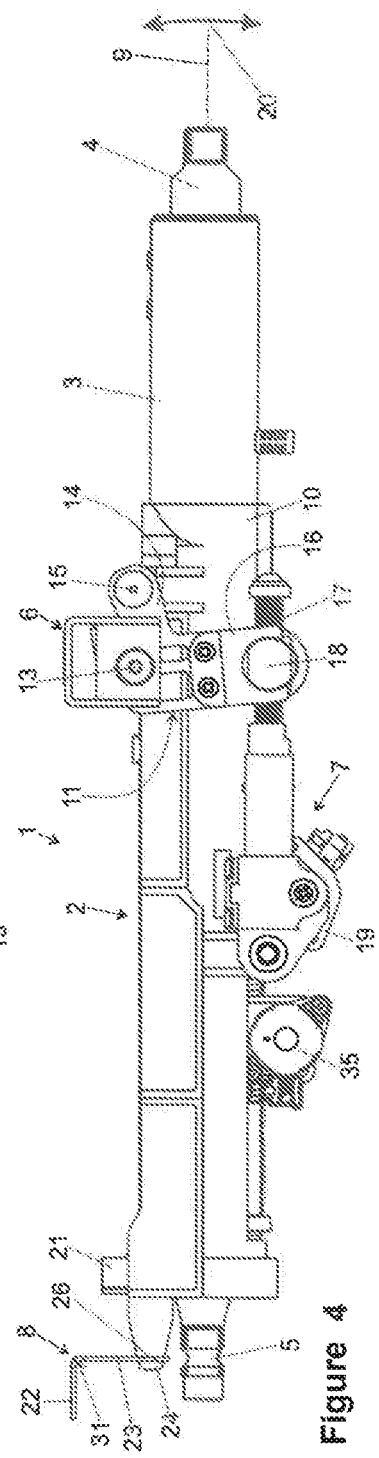
FIG. 4 is an overhead view of the steering column of FIG. 3 in a central position.
Figure 6:
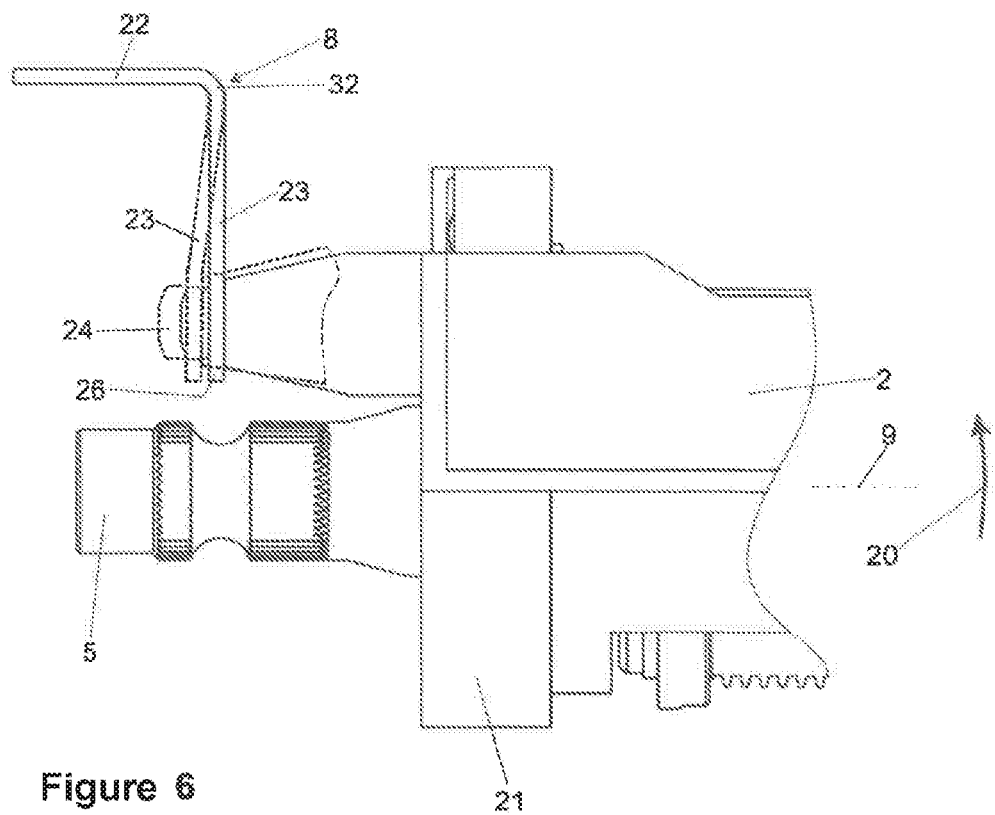
FIG. 6 is a detailed view of a front-end portion of the steering column having a bracket element in the central position, and in an illustration with dashed lines in the state completely deployed in an upward manner.

For example, a line drawn through the rotation axes of the bolts 13 and 15 in the illustration of FIG. 4 lies so as to be substantially parallel to the rotation axis 9, on account of which the actuating unit 2 in relation to the holding unit 6 is located in a position displaced to the maximum in the direction of the steering wheel. This position in terms of the effect thereof on the position of the bending portion 23 of the bracket element 8 is illustrated by solid lines in the detailed illustrations of FIGS. 6 and 7. However, if the height adjustment is moved completely in an upward manner, as shown in FIG. 6, the pivot lever 14 in relation to the rotation axis 9 is rotated in the counter-clockwise manner by a clearly visible angle. The effective length in the direction of the rotation axis 9 between the axes of the bolts 13 and 15 is however shortened thereby, such that the actuating unit 3 by a range of a few millimeters is displaced toward the left. This situation is illustrated by dashed lines in the enlarged illustration of FIG. 6. Since the first end region 10 of the actuating unit 2 is adjusted in an upward manner in the pivoting direction 20, and an axial displacement in a manner parallel to the rotation axis 9 simultaneously takes place toward the front (toward the left in FIG. 6), the bending portion 23 at the bending location 32 bends in the clockwise manner, wherein the second end region 26 is likewise displaced toward the front (toward the left). However, the first end region 10 of the actuator unit 2 is simultaneously pivoted in an upward manner in the pivoting direction 20 such that the bending portion 23 at a second bending location 33 is spent in the counter-clockwise manner.

Figure 7:
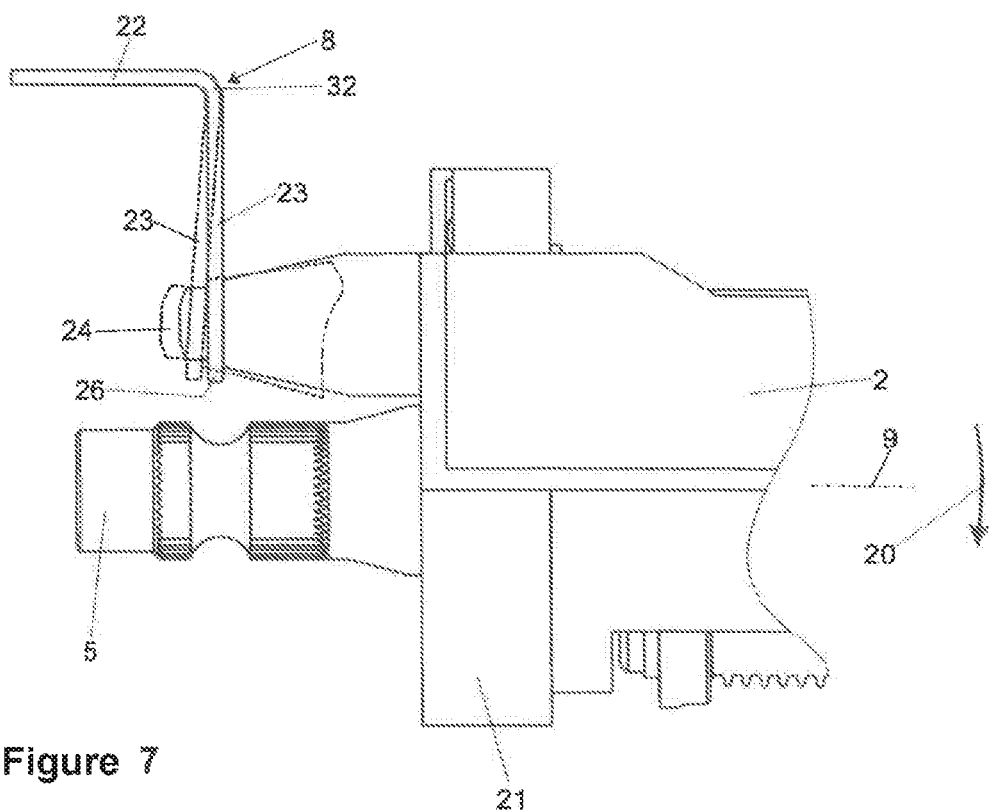
FIG. 7 is a detailed view of the front end portion of the steering column having a bracket element in the central position, and in an illustration with dashed lines in a state completely deployed in a downward manner.

This is different when the height adjustment is adjusted completely in a downward manner in the pivoting direction 20 (FIGS. 5, 7). In this case, the pivot lever 14 is pivoted in the clockwise manner, wherein a shortening of the spacing between the axes of the bolts 13 and 15 again results in relation to the central position shown in FIG. 4. This results in the actuating unit 2 being again displaced in a manner parallel to the rotation axis 9 toward the front (toward the left in FIG. 7). As can be seen from the dashed illustration of the bending portion 23, the latter is significantly bent in the clockwise manner only at the first bending location 30. This lies in that the actuating unit 2 in the lower adjusted position of the height adjustment is also pivoted in the clockwise manner (downward in the pivoting direction 20).

On account of the design embodiment according to the invention, the bracket element 8 enables elastic deformations which permit vertical pivoting as well as an axial displacement of the actuating unit 2.

The bracket element 8 is preferably designed as a stamped and bent component. This enables a particularly cost-effective production. The sheet steel of the bracket element 8 in the present embodiment has a thickness of approximately 1 mm. Said sheet steel herein permits pivoting of the actuating unit 2 up to 5° (+/−2.5°) as well as an axial displacement by up to 5 mm without departing from the elastic state of tension, such that the bracket element 8 in a non-stressed state reverts to the original shape thereof. The deformation is thus reversible.

The bracket element 8 in the present embodiment is fastened to the actuating unit 2 as well as to the vehicle chassis by means of fastening screws. However, other types of fastenings such as rivets, clamping connections, form-fit (clasp), the formation of fastening elements, and adhesive bonding can however also be considered instead of the fastening screws. Furthermore, the bracket element 8 can also be non-releasably connected to the actuating unit 2, for example by joining methods such as welding or soldering/brazing, or in that the bracket element and the actuating unit are designed as a single-piece integral component. In the latter case, the fastening elements can be dispensed with.

Apart from the height adjustment, the steering column 1 shown also has an electromotive longitudinal adjustment. This enables the casing tube 3 to be displaced in the axial direction in relation to the actuating unit 2, in a manner parallel to the rotation axis 9 of the steering shaft 4, 5. The upper steering shaft part 4 herein is mounted in the casing tube 3 so as to be rotatable by means of roller bearings such that said upper steering shaft part 4 in a displacement in the axial direction moves conjointly with the casing tube 3. The lower steering shaft part 5 is connected in a rotationally fixed manner to the upper steering shaft part 4 but so as to be telescopically displaceable in the direction of the rotation axis 9. The lower steering shaft part 5 by means of a roller bearing 34 is mounted so as to be rotatable in the second end region 21 of the actuating unit 2. An electromotive drive which has a second electric motor 35 which by way of a gear mechanism (not shown) and a second spindle drive 36 displaces the casing tube 3 in the axial direction in relation to the actuating unit 2 is provided for the longitudinal adjustment in the direction of the rotation axis 9.

The solution according to the invention in the case of a steering column 1 with a motorized height adjustment enables the actuating unit 2 to be pivotably fastened on the vehicle chassis with simultaneous longitudinal compensation in a simple and cost-effective manner by means of the bracket element 8 according to the invention.

LIST OF REFERENCE SIGNS

1 Steering column
2 Actuating unit
3 Casing tube
4 Steering shaft part
5 Steering shaft part
6 Holding unit
7 First motorized drive unit
8 Bracket element
9 Rotation axis
10 First end region
11 Lever device
12 Bridging portion
13 Bolt
14 Pivot lever
15 Bolt
16 Drive lever
17 Spindle nut
18 Spindle
19 First electric motor
20 Pivoting direction
21 Second end region
22 Fastening portion
23 Bending portion
24 Fastening screws
25 Recess
26 Lower end region
27 Central recess
28 Cruciform strut section
29 Fastening portion
30 Apertures
31 Pivot axis
32 First bending location
33 Second bending location
34 Roller bearing
35 Second electric motor
36 Second spindle drive

What is claimed is:

1. A steering column for a motor vehicle, the motor vehicle having a chassis, the steering column comprising:
 a steering shaft that is rotatable about a rotation axis;
 an actuating unit which receives the steering shaft, the actuating unit comprising a first steering-wheel proximal end region disposed on a holding unit and configured to pivot via a first motorized drive, and a second end region opposite the first end region,
 wherein the actuating unit in the second end region thereof is provided with an elastic bracket element which is configured to fasten to the vehicle chassis and via an elastic deformation permits pivoting of the actuating unit about a pivot axis as well as displacing the actuating unit along the rotation axis,
 wherein the elastic bracket element is configured such that a location of the pivot axis changes based on an operative angular position of the actuating unit.

2. The steering column of claim 1 wherein the actuating unit is coupled to the holding unit via a pivot lever, wherein the pivot lever is articulated so as to pivot on the actuating unit and on the holding unit.

3. The steering column of claim 1 wherein the bracket element comprises sheet metal.

4. The steering column of claim 1 wherein the bracket element is fastened to the actuating unit via one or more fastening elements.

5. The steering column of claim 1 wherein the bracket element is non-releasably connected to the actuating unit.

6. The steering column of claim 5 wherein the bracket element is fastened to the actuating unit by means of a joining method.

7. The steering column of claim 5 wherein the bracket element and the actuating unit are designed as a single-piece construction.

8. The steering column of claim 1 wherein the bracket element has a bending portion and a lower end region and an upper side, wherein the lower end region is connected to the actuating unit, and the upper side transitions to an angled fastening portion configured to fasten to the vehicle chassis.

9. The steering column of claim 1 wherein the bracket element has at least one strut section.

10. The steering column of claim 1 wherein the bracket element is a stamped and bent component.

11. The steering column of claim 1 wherein the bracket element has a thickness between 0.5 mm and 3 mm.

12. The steering column of claim 1 wherein a casing tube which by means of a second motorized drive is axially displaceable in relation to the actuating unit and which mounts the steering shaft so as to be rotatable is received in the actuating unit.

13. A steering column for a motor vehicle with a chassis, the steering column comprising:
- a steering shaft that is rotatable about a rotation axis; and
- an actuating unit that receives the steering shaft, the actuating unit comprising a first steering-wheel proximal end region disposed on a holding unit and configured to pivot via a first motorized drive, the actuating unit comprising a second end region opposite the first end region,
- wherein the actuating unit in the second end region thereof is provided with an elastic bracket element that is configured to fasten to the vehicle chassis and via elastic deformation permits pivoting of the actuating unit about a pivot axis as well as displacing the actuating unit along the rotation axis, wherein the pivot axis is spaced apart from the elastic bracket element at least for some operative angular positions of the actuating unit.

14. The steering column of claim 13 wherein the actuating unit is coupled to the holding unit via a pivot lever, wherein the pivot lever is articulated so as to pivot on the actuating unit and on the holding unit.

15. The steering column of claim 13 wherein the bracket element is fastened to the actuating unit via one or more fastening elements.

16. The steering column of claim 13 wherein the bracket element is non-releasably connected to the actuating unit.

17. The steering column of claim 16 wherein the bracket element and the actuating unit are designed as a single-piece construction.

18. The steering column of claim 13 wherein the bracket element has a bending portion and a lower end region and an upper side, wherein the lower end region is connected to the actuating unit, and the upper side transitions to an angled fastening portion configured to fasten to the vehicle chassis.

19. The steering column of claim 13 wherein the bracket element has at least one strut section.

20. The steering column of claim 13 wherein a casing tube which by means of a second motorized drive is axially displaceable in relation to the actuating unit and which mounts the steering shaft so as to be rotatable is received in the actuating unit.

* * * * *